United States Patent
Portman

(10) Patent No.: US 7,740,893 B2
(45) Date of Patent: Jun. 22, 2010

(54) SPORTS DRINK COMPOSITION FOR ENHANCING GLUCOSE UPTAKE INTO THE MUSCLE AND EXTENDING ENDURANCE DURING PHYSICAL EXERCISE

(75) Inventor: Robert Portman, Matawan, NJ (US)

(73) Assignee: Mott's LLP, Rye Brook, NY (US)

( * ) Notice: Subject to any disclaimer, the term of this patent is extended or adjusted under 35 U.S.C. 154(b) by 1123 days.

(21) Appl. No.: 11/337,414

(22) Filed: Jan. 23, 2006

(65) Prior Publication Data

US 2006/0193949 A1  Aug. 31, 2006

Related U.S. Application Data

(63) Continuation-in-part of application No. 10/638,908, filed on Aug. 11, 2003, now Pat. No. 6,989,171, which is a continuation-in-part of application No. 09/824,357, filed on Apr. 2, 2001, now abandoned.

(51) Int. Cl.
*A23L 1/29* (2006.01)

(52) U.S. Cl. ............... 426/590; 426/583; 426/656; 426/658

(58) Field of Classification Search ............ 426/590, 426/656, 658, 583
See application file for complete search history.

(56) References Cited

U.S. PATENT DOCUMENTS

| | | | |
|---|---|---|---|
| 4,042,684 A | 8/1977 | Kahm | |
| 4,853,237 A | 8/1989 | Prinkkilä et al. | |
| 4,871,550 A | 10/1989 | Millman | |
| 4,874,606 A | 10/1989 | Boyle et al. | |
| 4,921,877 A | 5/1990 | Cashmere et al. | |
| 5,032,411 A | 7/1991 | Stray-Gundersen | |
| 5,104,677 A | 4/1992 | Behr et al. | |
| 5,221,668 A | 6/1993 | Henningfield et al. | |
| 5,270,297 A | 12/1993 | Paul et al. | |
| 5,397,786 A | 3/1995 | Simone | |
| 5,416,077 A | 5/1995 | Hwang et al. | |
| 5,780,094 A | 7/1998 | King | |
| 5,817,364 A | 10/1998 | Olin | |
| 6,017,550 A | 1/2000 | Berk et al. | |
| 6,039,987 A | 3/2000 | Strahl | |
| 6,051,236 A * | 4/2000 | Portman | 424/725 |
| 6,077,558 A | 6/2000 | Euber | |
| 6,113,195 A | 9/2000 | Mercier et al. | |
| 6,207,638 B1 | 3/2001 | Portman | |
| 6,989,171 B2 * | 1/2006 | Portman | 426/590 |

FOREIGN PATENT DOCUMENTS

WO  9705789 A1  2/1997

* cited by examiner

*Primary Examiner*—Helen F Pratt
(74) *Attorney, Agent, or Firm*—Cantor Colburn LLP

(57) ABSTRACT

The present invention provides for a nutritional composition in a dry powder form or a liquid drink form for optimizing muscle performance during exercise. The nutritional composition includes carbohydrate and protein in a ratio, in the range of 2.8 to 4.2 parts of the carbohydrate to 1.0 part of the protein. The carbohydrate is composed of a mixture of three sugars which are characterized by the fact that they are transported from the GI tract into the plasma via different transport pathways, specifically, the glucose pathway, the fructose pathway and the disaccharide pathway. One or more proteins are in the range of 10.29% to 32.25% by weight of the dry composition. The nutritional composition further includes electrolytes for replenishing electrolytes lost during exercise and for facilitating intestinal reabsorption of fluid. The carbohydrates are transported to the plasma via multiple transport pathways: one for glucose and similar sugars, another for fructose and similar sugars, and another for the complex sugars.

11 Claims, No Drawings

SPORTS DRINK COMPOSITION FOR ENHANCING GLUCOSE UPTAKE INTO THE MUSCLE AND EXTENDING ENDURANCE DURING PHYSICAL EXERCISE

RELATED APPLICATIONS

This Application is a continuation-in-part of U.S. patent application Ser. No. 10/638,908, filed on Aug. 11, 2003, now U.S. Pat. No. 6,989,171, which is a continuation-in-part of application Ser. No. 09/824,357, filed on Apr. 2, 2001, now abandoned.

FIELD OF THE INVENTION

The present invention relates to a nutritional composition for optimizing muscle performance improving hydration, extending endurance during exercise and preventing muscle damage after exercise. More particularly, the nutritional composition includes carbohydrates and protein in a 4 to 1 ratio to stimulate insulin and glucose uptake during exercise.

BACKGROUND OF THE INVENTION

Over the past thirty years, there has been extensive research conducted on the role hydration and carbohydrate supplementation play in improving exercise performance. This research led to the development of sports drinks that contain carbohydrate in the range of 6-8%, as well as essential electrolytes such as sodium, potassium, magnesium and chloride. Numerous studies have shown that consumption of a sports drink during exercise containing carbohydrate and electrolytes enables athletes to extend their endurance capacity to a greater extent than by the consumption of water alone.

When a sports drink is consumed during exercise, the carbohydrate is transported from the blood into the muscle where it then can be converted into energy. Normally, glucose uptake is controlled by insulin. However, during periods of intense activity, there is a decrease in the production of insulin and glucose is transported into the muscle primarily by the contraction of the muscle cell. The uptake of glucose into the muscle is critical to preserve muscle glycogen. To the degree that muscle glycogen is preserved, there is an enhancement in endurance capacity since more muscle glycogen is then available in the later stages of exercise.

The concentration of carbohydrate in the plasma is critical in determining the amount available for transport into the muscle cell and use in energy contraction. The levels of carbohydrate in the plasma are in large part controlled by the amount of carbohydrate that is absorbed into the plasma from the GI tract and the amount of carbohydrate that is transported into the muscle. Carbohydrate is transported from the gut to the plasma via multiple pathways. There is a specific transport pathway for glucose, a simple sugar, a specific transport pathway for fructose, another type of simple sugar, and a third transport pathway for disaccharides such as sucrose. Most sports drinks contain predominantly one type of sugar, either sucrose or fructose. A sports drink that contains predominantly one type of sugar is not as effective in extending endurance. The reason is a sports drink that contains primarily one type of sugar will overwhelm the transporter system. If the drink contains primarily fructose it will overwhelm the fructose transporter system. If it contains primarily glucose it will overwhelm the glucose transporter system. This can have a negative impact on the effectiveness of the sports drink since, if less carbohydrate can be transported from the gut to the plasma then less carbohydrate will be available in the plasma for transport into the blood. When the amount of carbohydrate in the plasma becomes rate limiting muscle cells increase their utilization of their own carbohydrate source called glycogen.

The faster that muscle glycogen is depleted the faster that muscle fatigue ensues and endurance is decreased.

The transport of carbohydrate from the plasma into the muscle cell is largely controlled by insulin and different carbohydrate transporters than that seen in the gut but which have a similar function. It has been shown that when insulin is stimulated during intense exercise there is a greater uptake of glucose. Increasing carbohydrate consumption during exercise can stimulate insulin to a point. When very high levels of carbohydrate are consumed during exercise they do not empty from the stomach rapidly so carbohydrate intake becomes rate limiting in its ability to stimulate insulin.

Previously, it has been shown that when protein is added to a source of carbohydrate, it can provide enhanced stimulation of insulin. The level of protein is critical since protein has been shown to slow gastric emptying. U.S. Pat. No. 6,207,638 showed that when protein is added to carbohydrate in a 4 to 1 ratio, it provides increased insulin stimulation and enhances the synthesis of muscle glycogen with no negative impact on rehydration following exercise. In addition to stimulating insulin to improve carbohydrate uptake, a second but important benefit of using a combination of carbohydrates that have specific transport systems is a more rapid uptake of carbohydrate into the muscle.

There is a definite need in the art for sports drinks that will maximize the uptake of glucose during exercise, thereby providing an immediate source of energy and improve endurance by the sparing of muscle glocogen stores. It is the object of this invention to provide a sports drink that will improve athletic performance during exercise.

DESCRIPTION OF THE PRIOR ART

Sports drinks to enhance stamina have been disclosed in the prior art.

Prinkkila in U.S. Pat. No. 4,853,237 discloses a fitness drink powder containing glucose polymer, various salts and fruit acid. The drink composition of Prinkkila is designed to be available to the body in an optimum manner. In addition, the drink product is designed to maintain a high sugar concentration in the blood during physical exertion.

In U.S. Pat. No. 5,032,411 Stray-Gunderson discloses a hypotonic beverage with essential electrolytes, minerals and carbohydrates. Because the beverage composition is hypotonic, the stomach empties very rapidly and the composition can produce a beneficial physiologic response.

Kahm in U.S. Pat. No. 4,042,684 discloses a dietetic beverage containing sugar and essential salts. The composition is said to enhance energy stores. In addition, the composition does not require preservatives. The mixture of glucose and fructose used in the composition produces rapid transport of glucose out of the digestive system while fructose is more slowly transported out of the system.

Strahl in U.S. Pat. No. 6,039,987 discloses a composition to prevent dehydration and prevent cramps which contains electrolytes, carbohydrates and quinine.

King in U.S. Pat. No. 5,780,094 discloses a sports beverage containing a saccharide in the amount of 1.25% weight to volume of glucose.

Simone in U.S. Pat. No. 5,397,786 discloses a rehydration drink that contains carbohydrate, various electrolytes and one ammonia neutralizer such as aspartate, arginine and glutamate.

A flavored and sweetened aqueous dietetic beverage used to rehydrate the body is disclosed by Boyle in U.S. Pat. No. 4,874,606. L-aspartyl-L-phenyl-alanine methyl ester is included in the beverage to increase the degree of gastric emptying.

None of the prior art patents disclose the nutritional composition of the present invention for enhancing endurance and performance during exercise.

Accordingly, it is an object of the present invention is to provide a nutritional composition for optimizing muscle performance during exercise.

Another object of the present invention is to provide a nutritional composition that will increase the amount of carbohydrate transported into the plasma from the GI tract.

Another object of the present invention is to provide a nutritional composition that will speed the uptake of glucose into the muscle cell during exercise.

Another object of the present invention is to provide a nutritional composition that will increase the efficiency of every gram of every carbohydrate consumed during exercise.

Another object of the present invention is to provide a nutritional composition for restoring fluid and electrolytes and for replenishing glycogen stores in the muscle and for reducing muscle damage.

Another object of the present invention is to provide a nutritional composition to speed the uptake of glucose into the muscle, thereby sparing muscle glycogen stores and extending endurance.

Another object of the present invention is to provide a nutritional composition that restores fluid and electrolyte levels that are depleted during exercise.

SUMMARY OF THE INVENTION

The present invention provides for a nutritional composition in a dry powder form for optimizing muscle performance during exercise. The dry nutritional composition includes 3 different carbohydrates and protein in a ratio, in the range of 2.8 to 4.2 parts of the carbohydrates to 1.0 part of the protein. The 3 carbohydrates are sugars in the range of 50.51% to 84.81% by weight of the dry composition. One or more proteins are in the range of 10.29% to 32.25% by weight of the dry composition. The dry nutritional composition also includes a first electrolyte ion being sodium ($Na^+$) compounds in the range of 0.18% to 1.34% by weight of the dry composition for replenishing electrolytes lost during exercise and for facilitating intestinal reabsorption of fluids; and a second electrolyte ion being potassium ($K^+$) compounds in the range of 0.02% to 0.89% by weight of the dry composition for replenishing electrolytes lost during exercise and for facilitating intestinal reabsorption of fluid.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings.

DETAILED DESCRIPTION OF THE PREFERRED AND ALTERNATE EMBODIMENTS

The invention is based on the unexpected and surprising discovery that by providing a nutritional composition that contains 3 different carbohydrates and protein in a ratio in the range of 2.8 to 4.2 parts of said carbohydrates to 1.0 part of said protein, the energy efficiency of every gram of carbohydrate consumed during exercise is significantly increased.

A second unexpected and surprising discovery is that a carbohydrate/protein ratio in the range of 2.8 to 4.2 parts of said carbohydrates to 1.0 part of said protein permits protein to increase glucose uptake during exercise by stimulating insulin while not interfering with gastric emptying which would impact fluid and carbohydrate absorption during exercise.

A third unexpected and surprising discovery is that the nutritional composition of the present invention significantly increases endurance during exercise when compared to a sports drink containing the same amount of carbohydrate.

A fourth unexpected and surprising discovery is that by using a combination of three carbohydrates in an approximately equal ratio there is an increase in the amount of carbohydrate that is transported to plasma from the GI tract thereby making more carbohydrate available in the plasma which results in an increase in endurance.

The nutritional composition of the preferred and alternate embodiments of the present invention are in a dry form, a liquid drink, a bar or a gel format. The nutritional composition is used to enhance performance and extend endurance during exercise and prevent muscle damage.

In the present invention the preferred and alternate embodiments of the nutritional composition are as follows for a dry composition and for a liquid drink composition.

PREFERRED EMBODIMENT

The nutritional composition for improving muscle performance and extending endurance during exercise includes nutritional agents being 3 different carbohydrates and proteins. The sports drink of the present invention has 3 different carbohydrates instead of only one, such as glucose. In the present invention, the carbohydrates are of three different types consisting of glucose or a similar sugar, fructose or a similar sugar, and trehalose or a similar sugar, with each of the 3 being in equal amounts. In this manner, 3 different transport pathways are used for the 3 different carbohydrates which maximizes the amount of carbohydrates that are delivered into the plasma, which means that more carbohydrates get into the muscle. Therefore, during exercise, there is a longer period before the muscle begins to utilize its own glycogen as a source of carbohydrate. Thus, muscle endurance is increased.

One or more protein compounds are used in the forming of the dry nutritional composition. These proteins are used as a source of stimulation of insulin during exercise. Protein sources are selected from the group consisting of calcium caseinate, whey protein concentrate, whey protein isolate, whey protein hydrolyzate, soy protein, casein hydrolyzate, rice protein, wheat protein, corn protein and yeast concentrate. Total proteins are in the overall range of 10.29% to 32.25% (See Table B) (For an alternate range, see Table A.) by weight of the dry nutritional composition, having a preferred percentage of 18.66% (See Table A) by weight of the dry nutritional composition.

Carbohydrates and proteins are in the ratio in the range of 2.8 to 4.2 parts of the carbohydrates to 1.0 part of the protein such that the carbohydrate is used for providing energy during exercise and the protein, is used to accelerate the transport of the carbohydrate into the muscle cell during exercise thereby improving the efficiency of each gram of the carbohydrate. When the carbohydrate to protein ratio is less than 2.8, the protein has an adverse effect on gastric emptying which would slow rehydration and glucose absorption during exercise. Our research has shown that at a ratio of 4 to 1 (carbohydrate to protein) the benefits of protein on speeding glucose uptake during exercise are optimized with no negative impact on gastric emptying and rehydration.

Electrolytes being sodium, and potassium compounds are used within the nutritional composition for replenishing the electrolytes lost during exercise, for facilitating intestinal reabsorption of fluids, and for facilitating energy dependent processes. A first electrolyte being sodium compounds include sodium chloride, sodium acetate, acidic sodium citrate, acidic sodium phosphate, sodium bicarbonate, sodium bromide, sodium citrate, sodium lactate, sodium phosphate, anhydrous sodium sulphate, sodium sulphate, sodium tartrate, sodium benzoate and sodium selenite. A second electrolyte being potassium compounds include potassium chloride, potassium acetate, potassium bicarbonate, potassium bromide, potassium citrate, potassium-D-gluconate, monobasic potassium phosphate, potassium tartrate, potassium sorbate and potassium iodide. A first electrolyte ion being sodium ($Na^+$) compounds are in the overall range of 0.18% to 1.34% (See Table B) by weight of the dry nutritional composition, and have a preferred amount of 0.52% (See Table A) by weight of the dry nutritional composition. A second electrolyte ion being potassium ($K^+$) compounds are in the overall range of 0.02% to 0.89% (See Table B) by weight of the dry nutritional composition, and have a preferred percentage of 0.09% (See Table A) by weight of the dry nutritional composition.

FIRST ALTERNATE EMBODIMENT

Typically, the dry nutritional composition, as shown in Tables A and B, is mixed with water, such that approximately 36 grams of the dry nutritional composition is dissolved in twelve (12) ounces of water (340.2 grams) in order to provide the nutritional drink composition. Tables C and D shows the dry weight in grams of the constituent compounds of the nutritional composition prior to the dilution using water.

Total carbohydrates are in the overall range of 4.06% to 10.33% by weight of the nutritional drink composition having a preferred range of 5.76% to 7.59% by weight of the nutritional drink composition. See Tables D and C, respectively.

Total proteins are in the overall range of 1.37% to 2.19% by weight of the nutritional drink composition having a preferred range of 1.42% to 1.92% by weight of the nutritional drink composition. See Tables D and C, respectively.

A first electrolyte ion being sodium ($Na^+$) compounds are in the overall range of 0.03% to 0.08% by weight of the liquid nutritional composition having a preferred range of 0.04% to 0.05% by weight of the liquid nutritional composition. A second electrolyte ion being potassium ($K^+$) compounds are in the overall range of 0.00% to 0.06% by weight of the liquid nutritional composition having a preferred range of 0.01% to 0.01% by weight of the liquid nutritional composition.

Other embodiments for the nutritional composition include energy bars where the carrier is in the form of chocolate, oats, wheat, peanut butter, semi-dried fruits, grains and combinations thereof; and a gel.

CLINICAL STUDY

A study was conducted to measure the nutritional drink composition of the present invention vs. a carbohydrate sports drink containing an equal amount of carbohydrate. The object of this study was to measure the effect of performance parameters including endurance capacity during exercise as well as muscle recovery and muscle damage.

This study was conducted with 15 trained male cyclists measuring the effect of the nutritional composition and a beverage containing an equivalent amount of carbohydrate. The study was a crossover design in which all subjects received both treatments. On two separate occasions, the subjects exercised as follows: Subjects rode at 75% of $VO_{2max}$ at a self-selected cadence to volitional exhaustion followed 12-15 hours later by a second ride to exhaustion at 85% $VO_{2max}$. During the first ride subjects consumed either the nutritional drink composition or a drink containing the same amount of carbohydrate as the nutritional drink composition every 15 minutes of exercise. Following the first exercise bout, subjects consumed an equal amount of either the carbohydrate-only containing beverage or the nutritional drink composition. The trials were randomly assigned and spaced 7-14 days apart. During the trial blood was sampled and exercise parameters were measured.

The results showed that the subjects receiving the nutritional composition rode 29% longer ($p>0.05$) than when consuming the carbohydrate beverage. In the second ride subjects receiving the nutritional composition performed 40% longer than when consuming the carbohydrate beverage. Post-exercise plasma CPK levels, indicative of muscle damage, were 83% lower after the carbohydrate beverage.

These results showed that the nutritional drink composition not only raised plasma levels of glucose, but also, by stimulating insulin, increased the amount of glucose that could be transported into the muscle cell. Plasma glucose thereby provided an immediate source of energy to muscle thereby sparing muscle glycogen and increased overall endurance and recovery. In addition to improving endurance parameters, the protein in the nutritional composition reduced muscle damage.

ADVANTAGES OF THE PRESENT INVENTION

Accordingly, an advantage of the present invention is that it provides for a nutritional composition for optimizing muscle performance during exercise.

Another advantage of the present invention is that it provides a nutritional composition that will speed the uptake of glucose into the muscle cells during exercise.

Another advantage of the present invention is that it provides a nutritional composition that will increase the efficiency of every gram of every carbohydrate consumed during exercise.

Another advantage of the present invention is that it provides a nutritional composition for speeding recovery after exercise.

Another advantage of the present invention is that provides a nutritional composition that decreases muscle damage.

Another advantage of the present invention is that it provides for a nutritional composition for restoring fluid and electrolytes, and for replenishing glycogen stores in the muscle and for reducing oxidative and muscle stress.

Another advantage of the present invention is that it provides for a nutritional composition to speed the uptake of glycogen into the muscle, thereby sparing muscle glycogen stores and extending endurance.

Another advantage of the present invention is that it provides for a nutritional composition that restores fluid and electrolyte levels that are depleted during exercise.

Another advantage of the present invention is that it provides for a nutritional composition that reduces muscle damage after exercise.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

TABLE A

PREFERRED EMBODIMENT OF DRY COMPOSITION

| Item # | Ingredient | Preferred Amount | % Preferred | Range Low | Range High | Low % | High % |
|---|---|---|---|---|---|---|---|
| 1 | Carbohydrates | 25.66 | 79.47% | 20.53 | 30.79 | 63.58% | 95.35% |
| 2 | Proteins | 6.42 | 19.88% | 5.14 | 7.70 | 15.92% | 23.85% |
| 3 | A First Electrolyte Being Sodium | 0.18 | 0.56% | 0.14 | 0.22 | 0.43% | 0.68% |
| 4 | A Second Electrolyte Being Potassium | 0.03 | 0.09% | 0.02 | 0.04 | 0.06% | 0.12% |
|   | TOTALS | 32.29 | 100.0% | 25.83 | 38.75 | 80.0% | 120.0% |

TABLE B

ALTERNATE EMBODIMENT OF DRY COMPOSITION

| Item # | Ingredient | Range Amount Low | Range Amount High | Low % | High % |
|---|---|---|---|---|---|
| 1 | Carbohydrates | 15.0 | 40.0 | 43.49% | 115.98% |
| 2 | Proteins | 5.36 | 8.00 | 15.54% | 23.20% |
| 3 | A First Electrolyte Being Sodium | 0.10 | 0.30 | 0.29% | 0.87% |
| 4 | A Second Electrolyte Being Potassium | 0.01 | 0.20 | 0.03% | 0.58% |
|   | TOTALS | 20.47 | 48.5 | 59.35% | 140.63% |

TABLE C

PREFERRED EMBODIMENT OF LIQUID COMPOSITION

| Item # | Ingredient | Range Amount Low | Range Amount High | Low % | High % |
|---|---|---|---|---|---|
| 1 | Carbohydrates | 21.38 | 28.51 | 5.76% | 7.68% |
| 2 | Proteins | 5.35 | 7.13 | 1.44% | 1.92% |
| 3 | A First Electrolyte Being Sodium | 0.15 | 0.19 | 0.04% | 0.05% |
| 4 | A Second Electrolyte Being Potassium | 0.02 | 0.03 | 0.01% | 0.01% |
| 5 | Water | 340.0 | 340.0 | 90.46% | 92.67% |
|   | TOTALS | 366.9 | 375.86 | 97.71% | 102.33% |

TABLE D

ALTERNATE EMBODIMENT OF LIQUID COMPOSITION

| Item # | Ingredient | Range Amount Low | Range Amount High | Low % | High % |
|---|---|---|---|---|---|
| 1 | Carbohydrates | 15.00 | 40.00 | 4.02% | 10.72% |
| 2 | Proteins | 5.36 | 8.00 | 1.47% | 2.14% |
| 3 | A First Electrolyte Being Sodium | 0.10 | 0.30 | 0.03% | 0.08% |
| 4 | A Second Electrolyte Being Potassium | 0.01 | 0.20 | 0.00% | 0.06% |
| 5 | Water | 340.0 | 340.0 | 88.20% | 94.32% |
|   | TOTALS | 360.47 | 388.5 | 93.72% | 107.32% |

What is claimed is:

1. A nutritional composition taken during exercise for improving muscle performance, speeding muscle recovery, enhancing hydration, and extending endurance during exercise, comprising: a) a combination of three different carbohydrates in approximately 3 equal amounts wherein said three different carbohydrates are selected from the group consisting of glucose, fructose, sucrose, disaccharide trehalose, and polysaccharide maltodextrin; b) one or more proteins; c) said one or more proteins are selected from the group consisting of calcium or sodium caseinate, whey protein, whey protein concentrate, whey protein isolate, whey protein hydrolyzate, demineralized whey protein, milk protein, soy protein, soy protein isolate, soy protein concentrate, pea protein, rice protein, casein hydrolyzate, soy flour, rice protein, wheat protein, corn protein and yeast concentrate; and d) said carbohydrate and said one or more proteins being in a ratio in the range of 2.8 to 4.2 parts of said carbohydrate to 1.0 part of said one or more proteins.

2. A nutritional composition in accordance with claim 1, wherein one of the three different carbohydrates is glucose.

3. A nutritional composition in accordance with claim 1, wherein one of the three different carbohydrates is fructose.

4. A nutritional composition in accordance with claim 1, wherein one of the three different carbohydrates is disaccharide trehalose.

5. A nutritional composition in accordance with claim 1, further including: a) a first electrolyte ion being sodium (Na+) compounds for replenishing electrolytes lost during exercise and for facilitating intestinal reabsorption of fluids; and b) a second electrolyte ion being potassium (K+) compounds for replenishing electrolytes lost during exercise and for facilitating intestinal absorption of fluids.

6. A nutritional composition in the accordance with claim 1, wherein said carbohydrates are in the range of 50.51% to 84.81%.

7. A nutritional composition in the accordance with claim 1, wherein said proteins are in the range of 10.29% to 32.25%.

8. A nutritional composition in accordance with claim 1, wherein one of the three different carbohydrates is polysaccharide maltodextrin.

9. A nutritional composition in accordance with claim 1, wherein one of the three different carbohydrates is sucrose.

10. A nutritional composition taken during exercise for improving muscle performance and extending endurance during exercise, comprising: a) a carbohydrate including glucose for transporting same to the plasma on a first transport pathway in the body, and including fructose for transporting same to the plasma on a second transport pathway in the body, and including sucrose for transporting same to the plasma on a third transport pathway in the body; b) one or more proteins; and c) said carbohydrate and said one or more proteins being in a ratio in the range of 2.8 to 4.2 parts of said carbohydrate to 1.0 part of said one or more proteins.

11. A nutritional composition in accordance with claim 10, wherein said one or more proteins are selected from the group consisting of calcium or sodium caseinate, whey protein, whey protein concentrate, whey protein isolate, whey protein hydrolyzate, demineralized whey protein, milk protein, soy protein, soy protein isolate, soy protein concentrate, pea protein, rice protein, casein hydrolyzate, soy flour, rice protein, wheat protein, corn protein and yeast concentrate.

* * * * *